US007765768B2

(12) United States Patent
Liang et al.

(10) Patent No.: US 7,765,768 B2

(45) Date of Patent: Aug. 3, 2010

(54) DOOR, DEEP DRAW MOLDED DOOR FACING, AND METHODS OF FORMING DOOR AND FACING

(75) Inventors: Bei Hong Liang, Naperville, IL (US); Jason M. Walsh, Batavia, IL (US); Steven K. Lynch, St. Charles, IL (US); Mark A. Ruggie, Franklin, IL (US); Richard D. Trubey, Lutz, FL (US); Henry M. Coghlan, St. Charles, IL (US)

(73) Assignee: Masonite Corporation, Tampa, FL (US)

( * ) Notice: Subject to any disclaimer, the term of this patent is extended or adjusted under 35 U.S.C. 154(b) by 1034 days.

(21) Appl. No.: 11/035,023

(22) Filed: Jan. 14, 2005

(65) Prior Publication Data

US 2005/0217206 A1 Oct. 6, 2005

Related U.S. Application Data

(60) Provisional application No. 60/536,846, filed on Jan. 16, 2004, provisional application No. 60/536,845, filed on Jan. 16, 2004.

(51) Int. Cl.
*B44F 7/00* (2006.01)
*E06B 3/70* (2006.01)
*E04C 2/54* (2006.01)
*B32B 5/12* (2006.01)

(52) U.S. Cl. .......................... 52/784.1; 52/455; 52/313; 428/106

(58) Field of Classification Search ................... 52/313, 52/455, 783.11, 783.12, 784.1, 784.14, 784.15, 52/456, 457, 458, 474; 428/106
See application file for complete search history.

(56) References Cited

U.S. PATENT DOCUMENTS

| | | | | |
|---|---|---|---|---|
| 5,074,087 | A * | 12/1991 | Green | 52/309.9 |
| 5,075,059 | A * | 12/1991 | Green | 264/129 |
| 5,293,726 | A * | 3/1994 | Schick | 52/455 |
| 5,543,234 | A * | 8/1996 | Lynch et al. | 428/537.1 |
| 5,887,402 | A * | 3/1999 | Ruggie et al. | 52/455 |
| 6,079,183 | A * | 6/2000 | Moyes | 52/784.1 |
| 6,200,687 | B1 * | 3/2001 | Smith et al. | 428/537.1 |
| 6,312,540 | B1 * | 11/2001 | Moyes | 156/87 |
| 6,485,800 | B1 * | 11/2002 | Liittschwager et al. | 428/15 |
| 6,588,162 | B2 * | 7/2003 | Lynch et al. | 52/309.13 |
| 6,764,625 | B2 * | 7/2004 | Walsh et al. | 264/119 |
| 6,773,791 | B1 * | 8/2004 | Ruggie et al. | 428/156 |
| 7,021,015 | B2 * | 4/2006 | Lynch et al. | 52/309.13 |
| D529,624 | S * | 10/2006 | Lynch et al. | D25/48 |
| 7,137,232 | B2 * | 11/2006 | Lynch et al. | 52/784.1 |

(Continued)

FOREIGN PATENT DOCUMENTS

| | | |
|---|---|---|
| CN | 2247714 | 2/1997 |

(Continued)

*Primary Examiner*—Richard E Chilcot, Jr.
*Assistant Examiner*—Ryan D Kwiecinski
(74) *Attorney, Agent, or Firm*—Berenato & White, LLC

(57) ABSTRACT

The present invention relates to a wood composite panel having a major planar portion, at least one panel portion, and an inwardly extending contoured portion surrounding the panel portion and interconnecting the major planar portion and the panel portion. The contoured portion defines an interrelationship between a vector angle and a deep draw depth that achieve a satisfactory stretch factor. The present invention also relates to a door having the disclosed wood composite door facings, and methods of forming the facing and door.

20 Claims, 8 Drawing Sheets

U.S. PATENT DOCUMENTS

| | | | | |
|---|---|---|---|---|
| 2001/0029714 | A1 * | 10/2001 | Lynch et al. | 52/309.13 |
| 2003/0196396 | A1 * | 10/2003 | Lynch et al. | 52/311.1 |
| 2004/0035085 | A1 * | 2/2004 | Crittenden | 52/784.1 |
| 2004/0074186 | A1 * | 4/2004 | Lynch et al. | 52/455 |
| 2006/0185281 | A1 * | 8/2006 | Lynch et al. | 52/311.2 |

FOREIGN PATENT DOCUMENTS

| | | |
|---|---|---|
| EP | 0971093 | 1/2000 |
| GB | 2267529 | 12/1993 |
| TW | 269347 | 1/1996 |

* cited by examiner

DOOR, DEEP DRAW MOLDED DOOR FACING, AND METHODS OF FORMING DOOR AND FACING

CROSS REFERENCE TO RELATED APPLICATIONS AND CLAIM TO PRIORITY

The present application claims the benefit of priority of provisional application Ser. No. 60/536,846, filed Jan. 16, 2004, and provisional application Ser. No. 60/536,845, also filed Jan. 16, 2004, the disclosures of which are incorporated herein by reference and to which priority is claimed under 35 U.S.C. §119.

FIELD OF THE INVENTION

The present invention relates to a wood composite panel, such as a door facing, having a major planar portion, at least one panel portion, and an extending contoured portion surrounding the panel portion and interconnecting the major planar portion and the panel portion. The contoured portion has a vector angle and a draw depth that achieve a satisfactory stretch factor. The present invention also relates to a door having the disclosed wood composite door facings, and methods of forming the facing and door.

BACKGROUND OF THE INVENTION

Hollow core doors simulating natural, solid doors are well known in the art. Such doors typically include a peripheral frame, with two door facings secured to opposing sides of the frame. The door facings may be formed from wood composite, such as hardboard, medium density fiberboard, oriented strandboard, wood plastic composites, and the like. The facings may have a smooth, planar surface, a textured surface and/or a contoured surface. Contoured, or molded, door facings are often formed to have portions simulating stiles, rails and panels, as found in traditional wooden rail and stile doors.

Typically, the door also includes a core, which fills the internal void formed between the two opposing facings. The core may be formed from corrugated pads, low density fiberboard, particleboard, foamed insulation, or some other materials. For example, an expanding insulating foam material may be applied through holes drilled through the peripheral frame to provide access to the internal void. The core provides rigidity and structural integrity to the door, as well as desired thermal and acoustic characteristics of the door. However, the use of a core increases manufacturing costs.

Door facings formed from sheet molding compound (SMC) with expensive glass fibers, or similar resin based materials, may be formed to have deep draw contoured portions, given the moldable characteristics of such materials. However, the moldability of wood composites requires consideration of certain factors and parameters different than those addressed for SMC materials. Typically, a wood composite panel is formed from a loose mat of very short cellulosic fibers or particles. The mat may be 2 inches thick or more prior to compression. The mat is then compressed to form the facing or panel. As the mat is compressed, the fibers do not flow. Rather, the fiber mat is stretched, particularly in contoured portions. Contoured portions having steep sidewalls or curves, or deep draw depths, may result in surface cracks or defects due to the stretching of the fiber mat during compression.

SUMMARY OF THE INVENTION

The present invention is directed to a door having a peripheral frame and first and second wood composite door facings. Each facing has a peripheral portion with a surface secured to opposite sides of the frame. Each facing includes at least one inwardly disposed portion integral with the peripheral portion. The inwardly disposed portion of the first facing is aligned with and abuts the inwardly disposed portion of the second facing. At least one of the facings has a commercially acceptable exterior surface. The door may also include a core disposed between and adhered to the interiorly disposed surfaces of the first and second facings.

The present invention also discloses a door comprising a peripheral frame having first and second sides and first and second wood composite door facings. Each facing has a major planar surface having an exterior surface and an interior surface secured to the first and second sides, respectively, and at least one panel portion. An inwardly extending contoured portion surrounds the panel portion and interconnects and is integral with the major planar portion and the panel portion. The contoured portion has a vector angle and a draw depth that achieve a satisfactory stretch factor as shown in FIG. 6.

Also disclosed is a wood composite door facing. The facing includes a major planar portion, at least one panel portion, and an inwardly extending contoured portion. The major planar portion has a first surface adapted to be exteriorly disposed and a second surface adapted to be interiorly disposed. The contoured portion surrounds the panel portion and interconnects and is integral with the major planar portion and the panel portion. The contoured portion has a vector angle and a draw depth that achieve a satisfactory stretch factor as shown in FIG. 6.

The present invention also relates to a method of forming a wood composite door facing. A mold having a lower die and an upper die is provided. The lower die has a flat portion and at least one die cavity. The upper die has a flat portion and at least one downwardly extending contoured design complementary to the at least one die cavity. A cellulosic mat is disposed between the lower and upper dies. The mat is compressed between the lower and upper dies to form a door facing having a contoured portion and a planar portion. The contoured portion extends inwardly from and relative to a first surface of the planar portion adapted to be exteriorly disposed and opposite to a second surface adapted to be interiorly disposed. The contoured portion has a vector angle and a draw depth that achieve a satisfactory stretch factor as shown in FIG. 6.

A method of forming a door is also disclosed. A peripheral frame having first and second sides is provided. A first door facing is secured to the first side of the frame. The first facing has a contoured portion and a planar portion. The contoured portion has a vector angle and a draw depth that achieve a satisfactory stretch factor as shown in FIG. 6. A second door facing is secured to the second side of the frame. The second facing has a contoured portion and a planar portion. The contoured portion has a vector angle and a draw depth that achieve a satisfactory stretch factor as shown in FIG. 6. The contoured portion of the second facing is aligned with and abutting the contoured portion of the first facing. A core may be disposed and between the first and second facings.

DETAILED DESCRIPTION OF THE INVENTION

Figure 1:
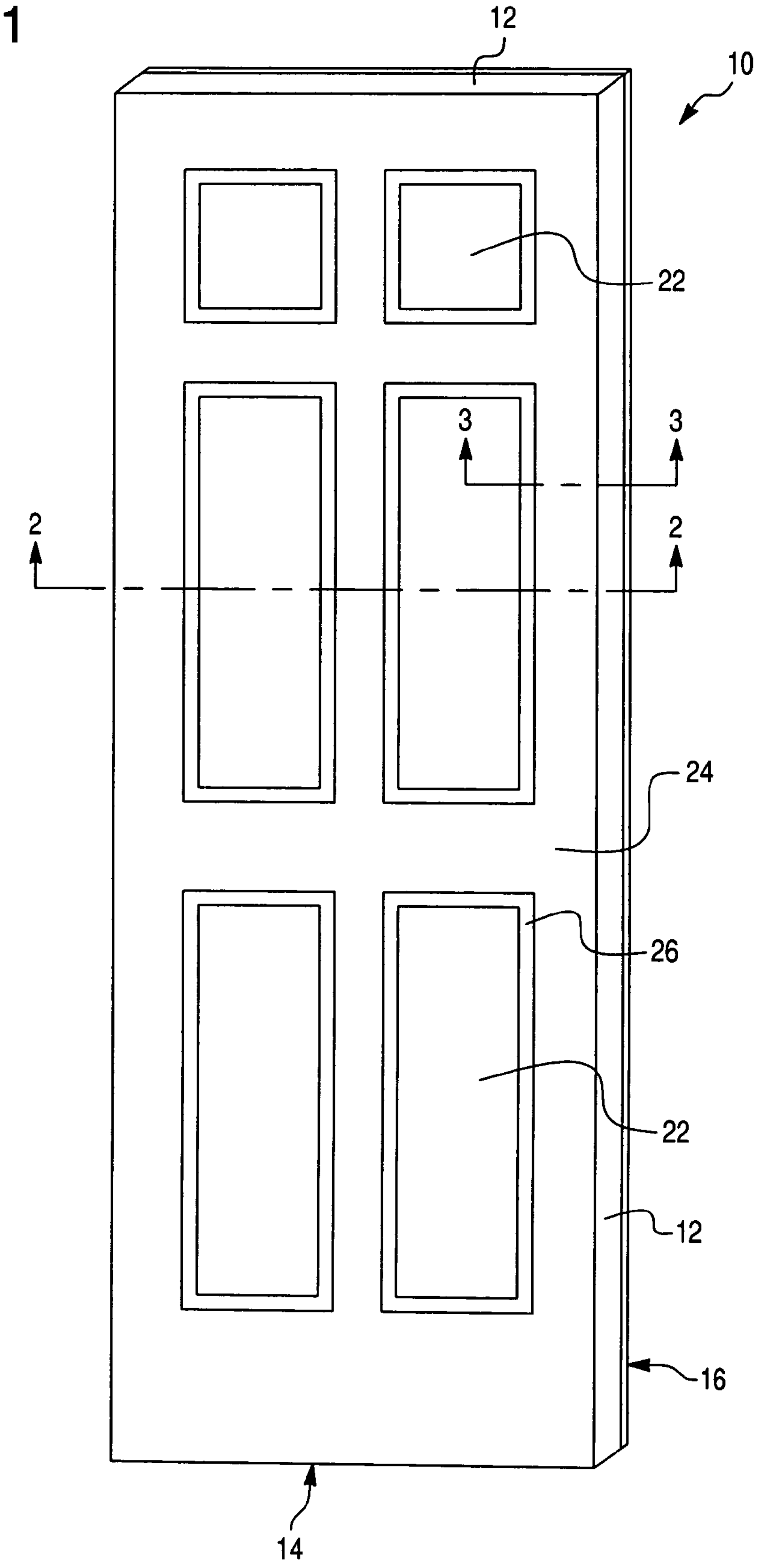
FIG. 1 is a perspective view of a coreless door according to an embodiment of the present invention.
Figure 2:
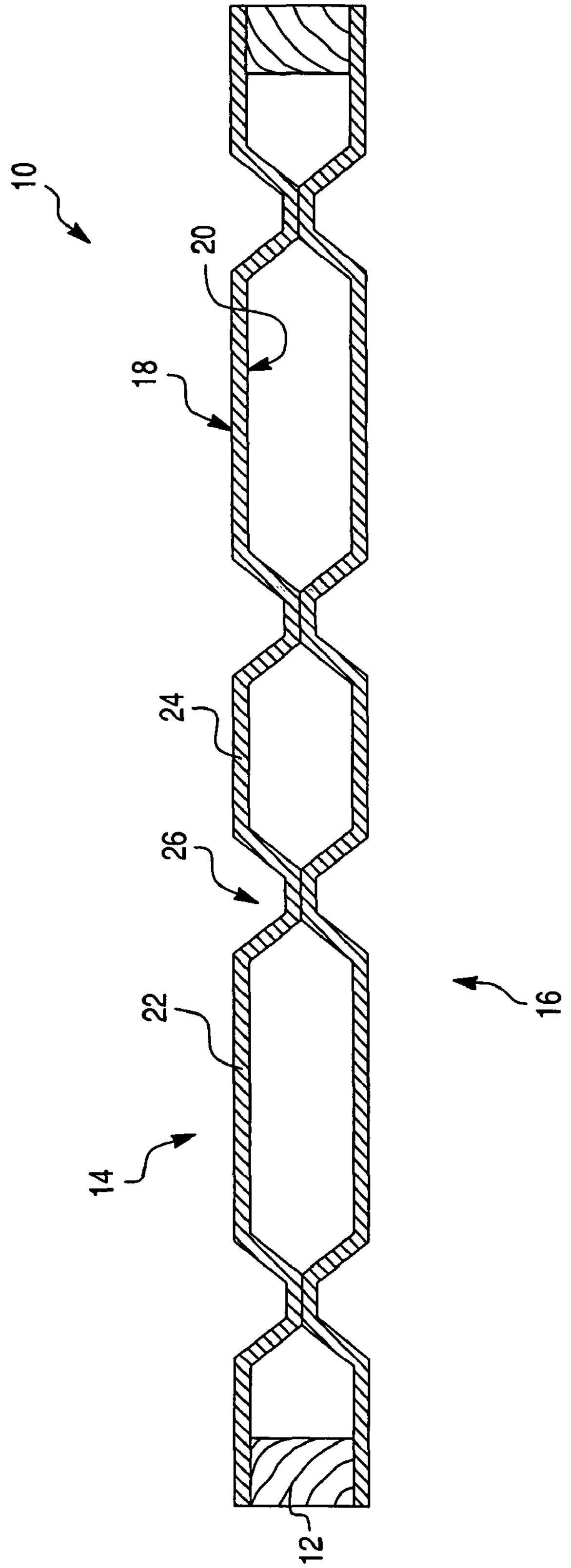
FIG. 2 is a cross-sectional view of the door of FIG. 1 taken along line 2-2 and viewed in the direction of the arrows.

As best shown in FIGS. 1 and 2, a coreless door 10 comprises a peripheral frame 12, and first and second wood composite door facings 14, 16. Each facing 14, 16 includes an exteriorly disposed first surface 18, and an interiorly disposed second surface 20 secured to opposing sides of frame 12. First and second facings 14, 16 each include one or more panel portions 22 and a major planar portion 24. A contoured portion 26 surrounds each panel portion 22, and is intermediate and integral with major planar portion 24 and panel portion 22. First and second facings 14, 16 may have identical configurations, as best shown in FIG. 2. Contoured portions 26 and panel portions 22 are aligned when facings 14, 16 are secured to frame 12.

Figure 3:
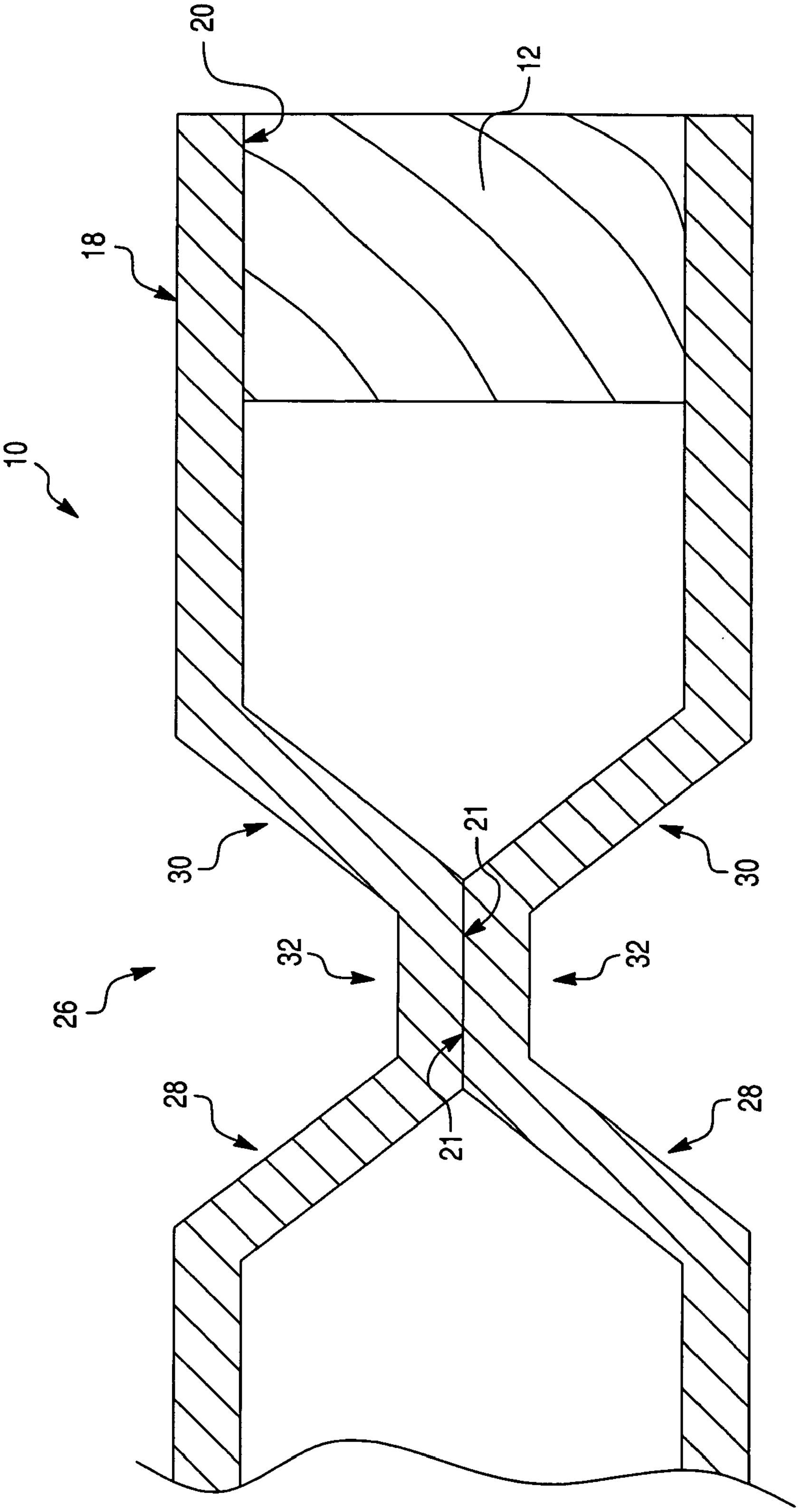
FIG. 3 is a fragmentary cross-sectional view of the door of FIG. 1 taken along line 3-3 and viewed in the direction of the arrows.

As best shown in FIG. 3, contoured portions 26 include first and second angled areas 28, 30, which extend inwardly relative to exteriorly disposed surface 18, and base 32. Angled areas 28, 30 extend inwardly a sufficient depth to allow interiorly disposed surfaces 20 of bases 32 on opposing facings 14, 16 to abut. Preferably, there is no gap between juxtaposed bases 32. Preferably, each base 32 has a flat interior surface portion 21, with juxtaposed surface portions 21 abutting in the resulting door 10. Surface portions 21 are preferably flat, but may have any other desired contour as long as the resulting abutting portions 21, when adhesively secured, provide a sufficient amount of surface area to enhance structural integrity. Facings 14, 16 may each have any configuration, so long as abutting portions 21 may be aligned and secured to provide sufficient structural integrity.

Figure 7:
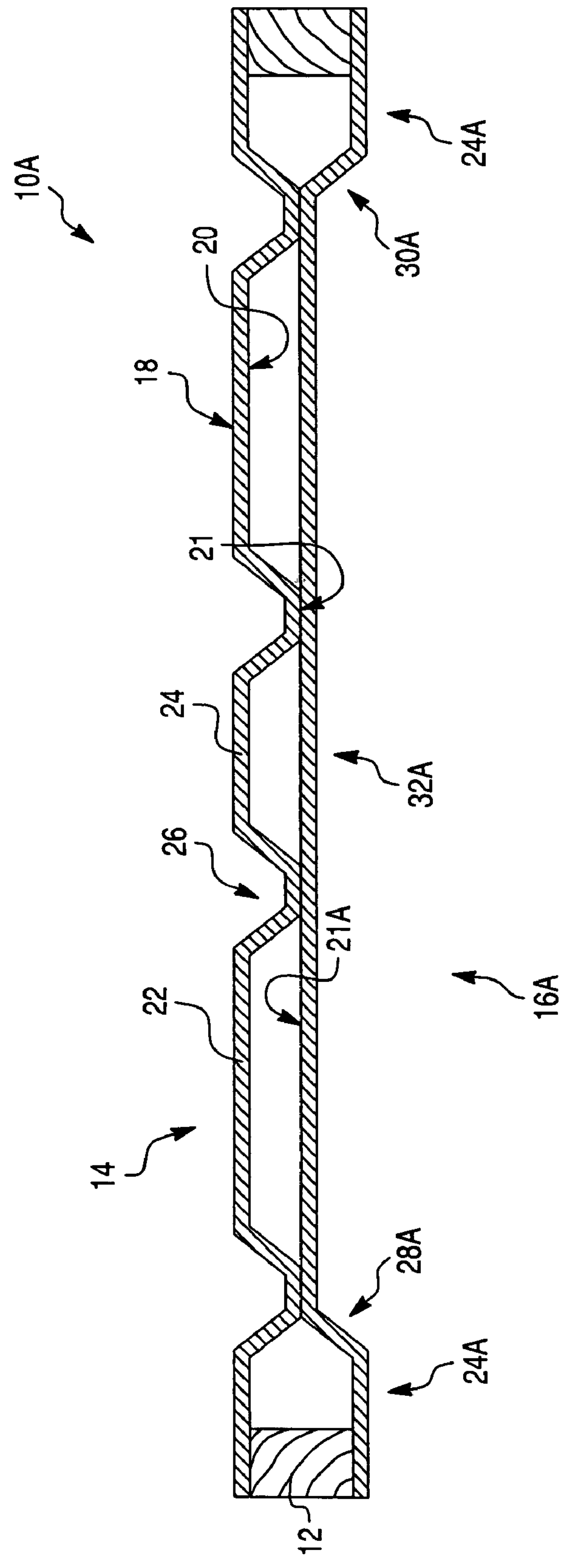
FIG. 7 is a cross-sectional view of a coreless door according to another embodiment.
Figure 7A:
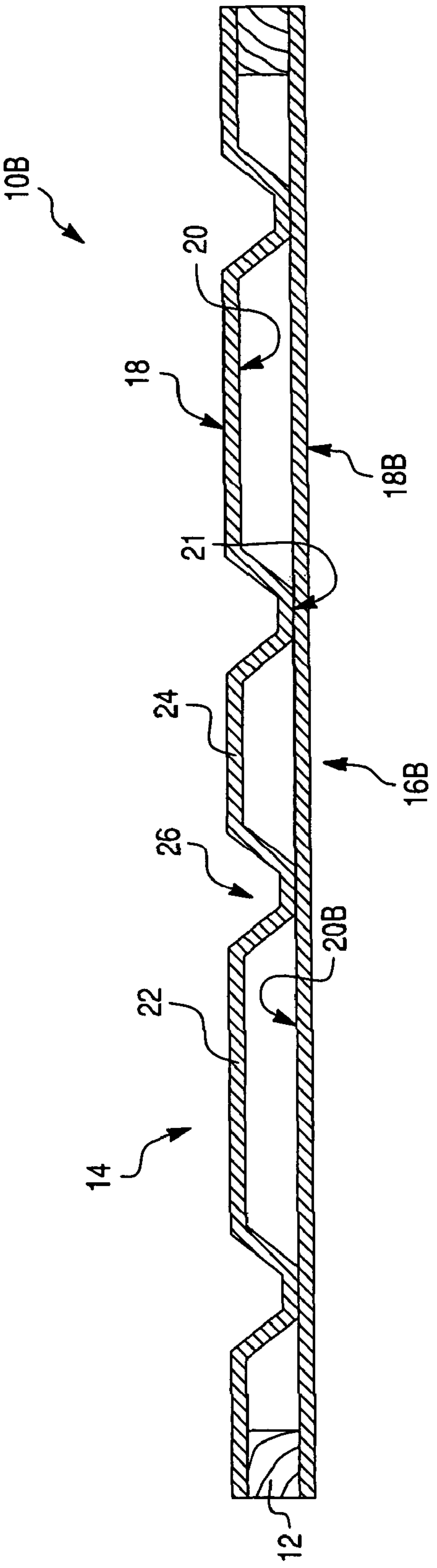
FIG. 7A is a cross-sectional view of a door according to another embodiment.

Although the embodiment shown in FIGS. 1-3 includes facings 14, 16 having identical configuration, it should be understood that facings 14, 16 may have different configurations, as best shown in FIG. 7. A coreless door 10A includes facing 14 and wood frame 12. However, a second facing 16A is differently configured compared to facing 14. Facing 16A includes peripheral portions 24A, angled areas 28A, 30A, and a base 32A. The interiorly disposed surface of peripheral portions 24A are secured to frame 12. Interior surface portions 21 of facing 14 abut and are secured to an interior surface portion 21A of facing 16A. Alternatively, a coreless door 10B may include facing 14 and a flush facing 16B, as best shown in FIG. 7A. Facing 16B includes a planar exteriorly disposed surface 18B and a planar interiorly disposed surface 20B. Interior surface portions 21 of facing 14 abut and may be secured to interiorly disposed surface 20B.

During manufacture of door 10, the periphery of interiorly disposed surface 20 of first facing 14 is secured to wood frame 12 using adhesive, fasteners, or the like. An adhesive, such as poly vinyl acetate and/or hot melt glues such as polyurethane reacted (PUR), may then be applied to the interior surface 21 of base 32 of first facing 14. Preferably, interior surface portions 21 have a sufficient length to permit juxtaposed surface portions 21 to be securely adhered together so that rigidity and structural integrity are provided. Second facing 16 (or 16A) is then secured to frame 12 using adhesive, fasteners, or the like, so that base 32 of second facing 16 is aligned with base 32 of first facing 14. In this way, the surface portions 21 are ensured to abut. The resulting assembly is then compressed, thereby securely adhering the facings 14, 16 to frame 12. The adhesive between surface portions 21 penetrates facings 14, 16, so that there is a glue bond without a gap between the interior surface portions 21 of base 32.

Figure 4:
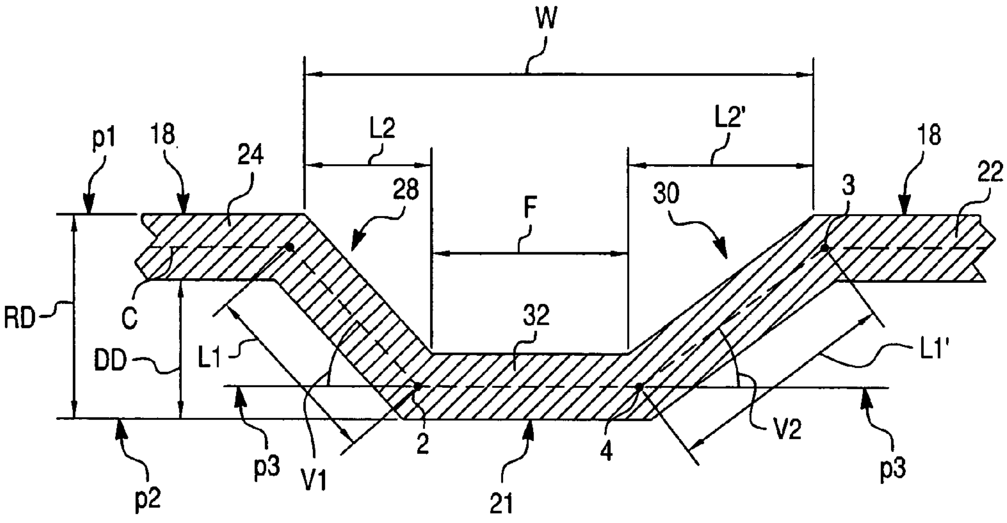
FIG. 4 is a fragmentary cross-sectional view of a door facing according to an embodiment of the present invention.

In order to achieve satisfactory surface quality of first surface 18, the angle at which angled areas 28, 30 extend relative to major planar surface 24 and panel portion 22 is adjusted depending on the draw depth of contoured portion 26. As best shown in FIG. 4, the exteriorly disposed surface 18 of major planar surface 24 lies on a first plane p1; and the interior surface 21 of base 32 lies on a second plane p2. A total recess depth RD is the distance between first plane p1 and second plane p2. The draw depth DD is the recess depth RD minus the caliper of facing 14 (or 16).

Figure 5:
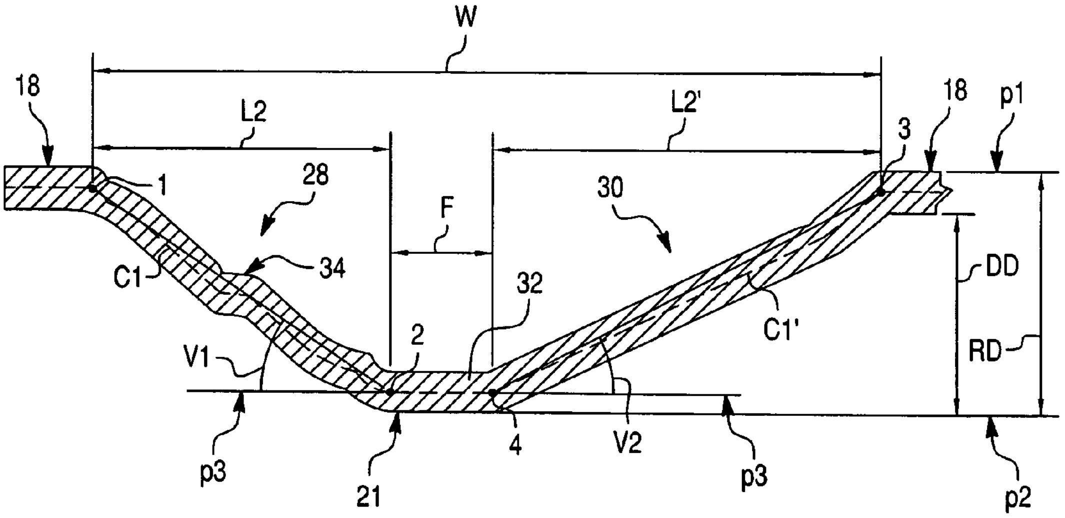
FIG. 5 is a fragmentary cross-sectional view of a door facing according to another embodiment of the present invention.

Angled areas 28, 30 may extend downwardly from major planar surface 24 and panel portion 22, respectively, at the same angle, as best shown in FIG. 4. However, angled area 28 and angled area 30 may extend downwardly at different angles, as best shown in FIG. 5. Angled area 28 may also have a different configuration than angled area 30. The predominant angle of the profile, or "vector angle", of angled area 28 is determined by striking a straight line from a first point 1 on major planar portion 24 directly adjacent the upper portion of angled area 28, and a second point 2 on base 32 directly adjacent the lower portion of angled area 28. First and second points 1, 2 are taken at the caliper midpoint of major planar portion 24 and base 32, respectively. The caliper midpoint is shown as a dashed line C on FIGS. 4 and 5. The angle between the line from points 1 and 2, or "vector line", and the plane p3 extending through point 2 and parallel to second plane p2 is the vector angle V1.

Likewise, a vector angle V2 of angled area 30 is determined by striking a straight line from a first point 3 on panel portion 22 directly adjacent the upper portion of angled area 30, and a second point 4 on base 32 directly adjacent the lower portion of angled area 30. First and second points 3, 4 are taken at the caliper midpoint of panel portion 22 and base 32, respectively. A vector angle V2 is the angle between the vector line from points 3 and 4 and plane p3. Whichever vector angle V1, V2 is greater is the vector angle. For example, in the configuration of contoured portion 26 shown in FIG. 5, the vector angle is vector angle V1 of angled area 28. It should be understood, however, that either angled area 28 or 30 may be the vector angle. Those skilled in the art will recognize either or both vector angles V1 and/or V2 may be adjusted in order to assure that the proper stretch factors are achieved.

In order to achieve satisfactory surface quality of exteriorly disposed surface 18, the vector angle is adjusted depending on the desired draw depth of contoured portion 26. Facings 14, 16 are molded from a loose mat of cellulosic fibers and a thermosetting binder, such as a urea formaldehyde, melamine formaldehyde, and/or phenol formaldehyde binder, commonly used in the manufacture of fiberboard. Preferably, facings 14, 16 are formed by a dry process, short fiber of between about 1 to 3 millimeters in length, cellulosic mat having a substantially constant basis weight or density. In addition, facings 14, 16 preferably have a substantially uniform caliper in the planar portions, with a caliper variability of about 15% or less in the contoured portions. The mat is compressed using heat and pressure. During compression of the mat, the fibers do not "flow". Rather, the cellulosic fiber mat is stretched thereby reducing the basis weight, particularly in contoured portions 26. If the fiber mat is stretched too much, cracks and other imperfections develop on exteriorly disposed surface 18. The resulting cracked facing is not commercially acceptable.

The amount of stretch of either angled area 28 or angled area 30 may be measured by the "local stretch factor." Typically, angled area 28 or angled area 30 has a length (length L1 and length L1') that is greater than a horizontal dimension of a corresponding length of a planar portion, such as L2 or L2' as shown in FIGS. 4 and 5.

As best shown in FIG. 4, the length of dashed line C between points 1, 2 (length L1) is greater than the distance between points 1, 2 measured along first plane p1 (length L2). Likewise, the length of dashed line C between points 3, 4 (length L1') is greater than the distance between points 3, 4 measured along first plane p1 (length L2'). The local stretch factor is determined by comparing the difference between the length of an angled area 28 or 30 and the length of a corresponding planar portion, (L1-L2) or (L1'-L2'), and then dividing the resulting difference by the length of the planar portion L2 or L2'. Thus, % local stretch factor of angled area 28=((L1/L2)−1))×100. The % local stretch factor of angled area 30=((L1'/L2')−1))×100.

Note that length L1 may be determined by a straight line from point 1 to point 2 if the angled area 28 (or 30) is substantially straight, as shown in FIG. 4. However, length L1 may also be greater than the straight line between points 1, 2 if angled area 28 (or 30) is curved and/or includes non-straight portions, as best shown by length C1 and C1' in FIG. 5. Note that length C1 is determined by the length of contoured line C between points 1 and 2. Line C extends through the caliper midpoint of the door facing. Length C1' is determined by the length of C between points 3 and 4. Thus, C1 (or C1') is not necessarily measured by a straight line between points 1, 2 (or 3, 4). The % local stretch factor is calculated in the same way as described above. However, for purposes of explanation, length line C1 is substituted for L1. As such, % local stretch factor of angled area 28 of FIG. 5=((C1/L2)−1))×100. Similarly, % local stretch factor of angled area 30 of FIG. 5=((C1'/L2')−1))×100.

Figure 6:
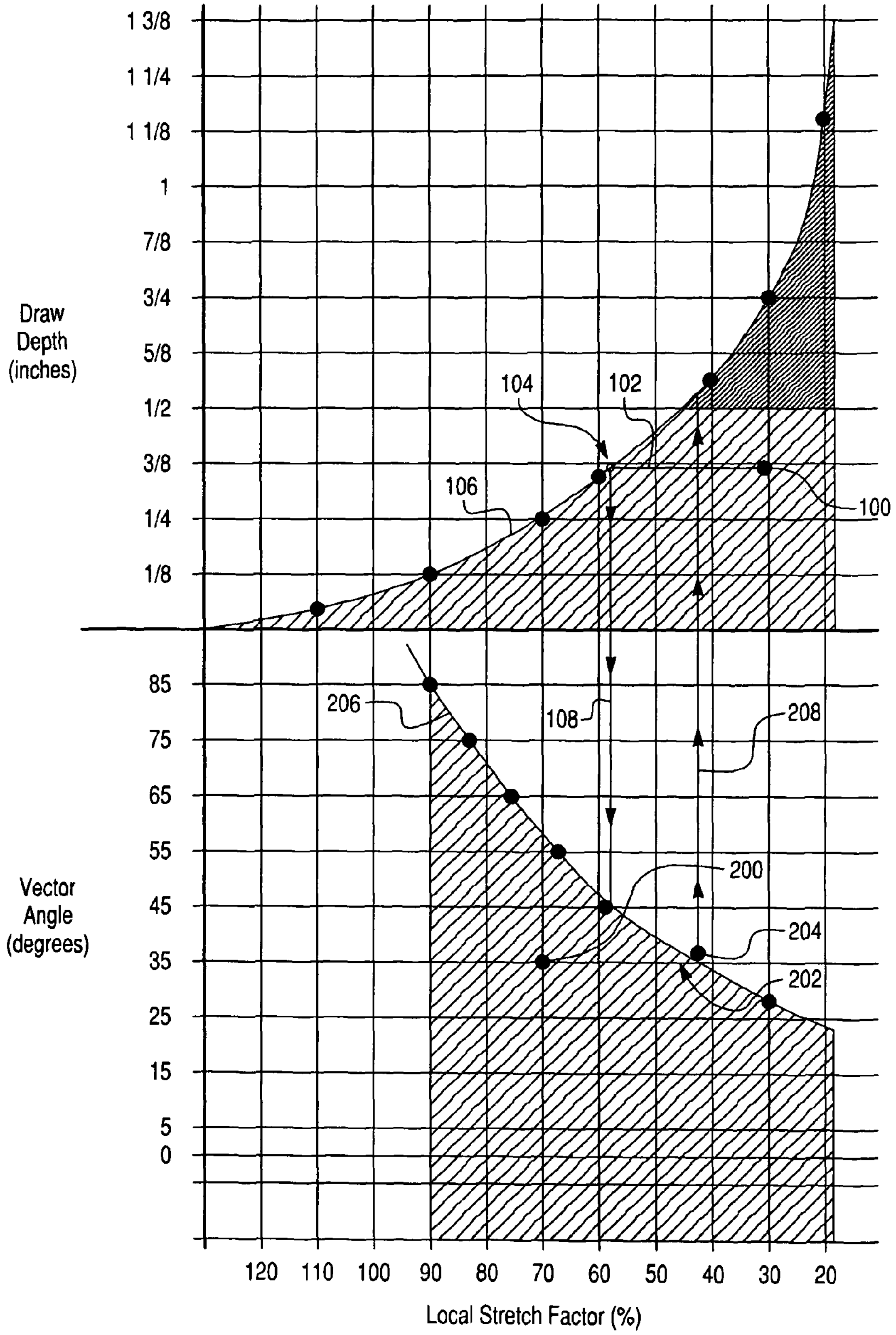
FIG. 6 is a chart showing the inter-relationship between the draw depth, the vector angle and local stretch factor of a contoured portion of a wood composite panel.

A permissible local stretch factor is inter-related to the vector angle and draw depth, as best shown in FIG. 6. The vector angle is set forth in degrees in FIG. 6, draw depth is set forth in inches, and local stretch factor is set forth in percentage. As noted above, local stretch factor increases as the vector angle increases, following curved boundary line 206. Similarly, as draw depth increases, the length of angled areas 28, 30 increases. Therefore, as draw depth increases, the permissible local stretch factor decreases, following curved boundary line 106. A permissible local stretch factor is an acceptable amount of stretch in areas forming angled areas 28, 30, which result in a contoured portion 26 having a commercially acceptable exteriorly disposed surface 18. Generally, exteriorly disposed surface 18 should be substantially free of cracks, holes or other imperfections attributable to excessive stretching of the wood fiber mat. As a result, a commercially acceptable surface as produced pursuant to the invention is free of cracks and like surface imperfections attributable to excess stretching of the wood fiber mat, and readily accepts paint and provides an aesthetically attractive finished surface.

The vector angle may be adjusted depending on a desired draw depth, so that a permissible local stretch factor is achieved. Referring to FIG. 6, if a draw depth of about ⅜ inch is desired, a point 100 falling along the horizontal line 102 for draw depth of ⅜ is used as a starting reference point. Note that point 100 should fall within the shaded area of draw depth, which defines a zone that will achieve a satisfactory local stretch factor. At a point of intersection 104 of horizontal line 102 and curved boundary line 106, a line 108 taken from intersection 104 extending perpendicularly to horizontal line 102 passes through a permissible local stretch factor to a permissible vector angle. Therefore, for a draw depth of ⅜ inch, the vector angle should be about 45° or less, which will achieve a satisfactory local stretch factor of about 57% or less.

Draw depth may also be adjusted depending on a desired vector angle. Referring again to FIG. 6, if a vector angle of 35° is desired, a point 200 falling along the horizontal line 202 for a vector angle of 35° is used as a starting reference point. Note that point 200 should fall within the shaded area of the chart for vector angle values, which defines a zone that will achieve a satisfactory local stretch factor. At a point of intersection 204 of horizontal line 202 and the curved boundary line 206, a line 208 taken from intersection 204 extending perpendicularly to horizontal line 202 passes through a permissible local stretch factor to a permissible draw depth. Therefore, for a vector angle of about 35°, draw depth should be about ½ inch or less, which will achieve a satisfactory local stretch factor of about 42% or less.

Thus, a vertical line on the chart shown in FIG. 6, relative to the y-axis, intersects a local stretch factor, intersects curved boundary line 106 indicating a corresponding draw depth, and intersects curved boundary line 206 indicating a corresponding vector angle. The intersection points provide maximal values for the draw depth and the vector angle, in order to achieve a particular local stretch factor.

For wood composite panels, such as facings 14, 16, molded to have a contoured portion 26 with a relatively deep draw depth (i.e. about ½ inch or greater), the vector angle is preferably about 35° or less, which achieves a local stretch factor of preferably about 45% or less and a total stretch factor of 25% or less. Draw depths of about ½ inch or greater are identified on the chart of FIG. 6 in a dark shaded area labeled "deep draw area". Other permissible parameters for a contoured portion 26 may also be determined using the chart provided in FIG. 6. For example, a contoured portion 26 having a vector angle of about 85° preferably has a draw depth of about ⅛ inch or less, which will achieve a permissible local stretch factor of about 90% or less.

In addition to adjusting the vector angle or draw depth, angled area 28 (or 30) may include a bump, or dam 34, which extends outwardly from angled area 28 and is substantially parallel to first plane p1, as best shown in FIG. 5. Dam 34 is between points 1 and 2, or between points 3 and 4, depending on the desired configuration of contoured portion 26. Preferably, dam 34 has a length that is at least about 70% or more of the caliper of facing 14 (or 16) measured at major planar surface 24. As noted above, the cellulosic fibers forming facings 14, 16 undergo a greater amount of stretch in curved or angled portions compared to a planar portion lying on first plane p1 or a plane parallel thereto. Dam 34 may provide the desired aesthetic appearance of contoured portion 26. In addition, dam 34 buffers or softens the amount of stretch given its surface is parallel to first plane p1, and therefore the fibers in that area do not undergo as much stretch in and adjacent to dam 34. In this way, dam 34 allows manipulation of the stretch factor, compared to a corresponding contoured portion that does not include dam 34. Preferably, angled area 28 (or 30) includes dam 34 if contoured portion 26 has a draw depth of 0.5 inch or more.

Likewise, base 32 has a planar surface that is parallel to first plane p1 (and second plane p2), as best shown in FIG. 4-5. The amount of stretch for the entire contoured portion 26, or "total stretch factor", is determined by calculating the amount of stretch for angled areas 28, 30 (i.e. local stretch factors for portions L1 and L1' as shown in FIG. 4 and lengths C1 and C1' as shown in FIG. 5) as well as the amount of stretch for base 32 (length F). Thus, total stretch factor may be calculated by adding the total length of stretch of angled areas 28, 30 (L1+L1') or (C1+C1'), along with the length of base 32 (length F), and then dividing the total length (L1+L1'+F) or (C1+C1'+F) by the total width of contoured portion 26 (width W). Total stretch factor %=((L1+F+L1')/W)−1)×100, as shown in FIG. 4. Total stretch factor %=((C1+F+C1')/W)−1)×100, as shown in FIG. 5.

Total stretch factor is partially determined by local stretch factors for angled areas 28, 30, given total stretch factor includes local stretch factors of angled areas 28, 30. In addition, total stretch factor may be controlled by adjusting length F of base 32. Local stretch factor of angled areas 28, 30 is generally greater than the stretch factor for base 32, given base 32 is substantially planar relative to first plane p1. As noted above, base 32 need not be planar, and may include contoured portions. However, for most configurations of contoured portion 26, the fibers forming base 32 typically undergo less stretching compared to the fibers forming angled areas 28, 30. Thus, total stretch factor may be decreased by increasing length F of base 32, thereby decreasing the proportional contribution of L1 and L1' to total width W. For example, if a contoured portion 26 has a total width W of about 8 inches, and length F of about 2 inches, angled areas 28, 30 extend along the remaining length (which is greater than 6 inches due to stretching). If length F of base 32 is increased, the proportion of total width W encompassed by the length L1, L1' (or C1, C1') of angled areas 28, 30 is decreased, assuming total width W is maintained at 8 inches. In that event, the vector angle is increased. The proportional contribution to the total stretch factor by angled areas 28, 30 may be decreased by increasing the length of base 32. The total stretch factor may be decreased by increasing length F and/or increasing total width W so that the overall proportional contribution of lengths L1, L1' (or C1, C1') is decreased. Preferably, total recess width W is between about 1 inch and about 8 inch, with the vector angle and draw depth and length F adjusted accordingly to achieve a satisfactory local stretch factor as set forth in FIG. 6.

For purposes of manufacturing coreless door 10, base 32 preferably has a sufficient length F to permit interior surface portions 21 of base 32 of opposing facings 14, 16 to be securely adhered together, as best shown in FIGS. 2 and 3.

One method of forming facing 14 or 16 includes providing a mold having a lower die and an upper die. The lower die has flat portions for forming planar portions of facing 14, and at least one die cavity for forming contoured portion 26. The upper die has flat portions and a downwardly extending contoured design complementary to the mold die cavity of the lower die. A cellulosic mat is disposed between the lower and upper dies, and then compressed using heat and pressure. The resulting facing 14 (or 16) includes contoured portion 26, major planar portion 24, and panel portion 22. Contoured portion 26 extends inwardly from and relative to first surface 18 of major planar portion 24, as described above. Further, the dies are configured so that contoured portion 26 has a vector angle and a depth of draw that achieves a satisfactory local stretch factor % as set forth in FIG. 6.

Figure 8:
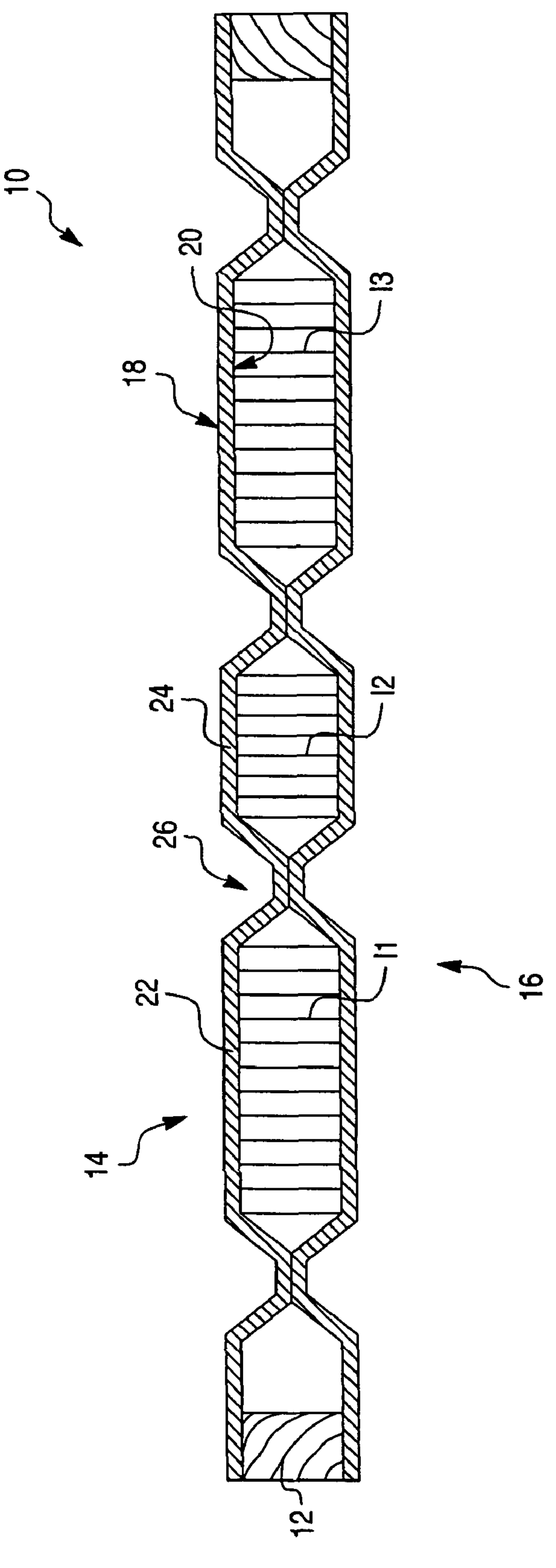
FIG. 8 is a cross-sectional view of a door according to another embodiment of the present invention.

Door 10', as best shown in FIG. 8 is similar to the door 10 of FIG. 2 and like reference numbers refer to like parts. Unlike the door 10, door 10' has a core provided by compressed corrugated paper inserts I1, I2 and I3. Inserts I1, I2 and I3 preferably have a thickness slightly greater than the distance between interior surfaces 20 of the door skins 14, 16. Preferably the inserts 11, 12 and 13 are adhesively secured to the facings 14, 16, such as through polyvinyl acetate and/or hot melt PUR. However, inserts I1, I2 and I3 may simply be positioned between facings 14, 16 without adhesively securing inserts I1, I2 and I3 therein.

As those skilled in the art recognize, doors, such as doors 10 and 10' are manufactured by adhesively securing the facings 14, 16 to the peripheral frame and then placing each such door into a stack. The stacks eventually contain a predetermined number of doors, and the stack is then transferred to a press. The press compresses the stack and thereby causes the facings 14, 16 to tightly engage the frame 14 while the adhesive cures. Because the inserts I1, I2 and I3 are slightly thicker than the distance between the inner surfaces 20, preferably by about 0.010 inches, and because the inserts are preferably made from corrugated paper, the inserts 11, 12 and 13 are crushed during compression in the frame. Because the inserts I1, I2 and I3 are crushed during curing of the adhesive in the press, the facings 14 and 16 do not bulge outwardly.

We have found the use of the inserts I1, I2 and I3 is beneficial in reducing any tendency of the facings 14, 16 to rattle while in use. Facings 14, 16 need not be adhesively secured together at abutting surface portions 21 as in the first embodiment because inserts I1, I2 and I3 provide sufficient structural integrity and minimize any rattling between facings 14, 16. Doors can be swung aggressively, with the result that facings 14,16 may in certain instances separate initially and then engage, with the result that a noise or rattle sound might be made if they are not secured at abutting surface portions 21 or if no inserts are provided. The compressed inserts I1, I2 and I3 essentially eliminate such door-created noises. Additionally, because the facings 14, 16 are adhesively secured to the inserts I1, I2 and I3, then some added strength is provided to the door.

While we prefer that the inserts I1, I2 and I3 be manufactured from corrugated paper and adhesively secured the facings 14, 16, other materials, such as medium density fiberboard or oriented strand board, may be used. Also, the inserts I1, I2 and I3 need not be adhesively secured and there may be one or more inserts.

While the present invention has been described in terms of a various door facing embodiments, one skilled in the art would understand that the disclosed invention is applicable for any wood composite decorative panel or wood plastic composite decorative panel.

Certain aspects of the present invention have been explained according to preferred embodiments. However, it will be apparent to one of ordinary skill in the art that various modifications and variations can be made in construction or configuration of the present invention without departing from the scope or spirit of the invention. Thus, it is intended that the present invention cover all such medications and variations.

We claim as follows:

1. A door, comprising:

a peripheral frame having first and second sides; and first and second wood composite door facings, each of said facings having a peripheral portion with a surface secured to one of said first and second sides, at least one inwardly disposed portion integral with said peripheral portion, said inwardly disposed portion of said first facing aligned with and abutting said inwardly disposed portion of said second facing, wherein at least one of said facings has a planar panel portion and an inwardly directed contoured portion, said inwardly directed contoured portion having a draw depth of more than 0.125 inches and a vector angle of less than 85 degrees, wherein the vector angle corresponds to the draw depth to achieve an exterior crack-free surface.

2. The door of claim 1, wherein said inwardly disposed portion of said first facing is adhesively secured to said inwardly disposed portion of said second facing.

3. The door of claim 1, wherein each of said facings has a planar panel portion and an inwardly directed contoured portion, said inwardly directed contoured portion having a draw depth of more than 0.125 inches and a vector angle of less than 85 degrees, wherein the vector angle corresponds to the draw depth to achieve an exterior crack-free surface.

4. The door of claim 3, wherein said contoured portions each have first and second vector angles, one of said vector angles exceeding the other of said vector angles.

5. The door of claim 3, wherein said contoured portions each have first and second vector angles, said first and second vector angles being the same.

6. The door of claim 3, wherein said contoured portion has a total stretch factor of less than 25%.

7. The door of claim 6, wherein said contoured portion local stretch factor of less than 45%.

8. The door of claim 3, wherein said contoured portion includes a centrally disposed dam extending outwardly therefrom, said dam substantially parallel to said planar panel portion.

9. The door of claim 1, further comprising a core disposed between said first and second facings.

10. The door of claim 9, wherein each of said facings has a planar panel portion and an inwardly directed contoured portion, said core disposed between said planar panel portions of said first and second facings.

11. The door of claim 10, wherein said core is adhesively secured to said first and second facings.

12. The door of claim 10, wherein said core is formed from a material selected from the group consisting of corrugated paper, medium density fiberboard, and oriented strand board.

13. The door of claim 12, wherein said core includes a plurality of corrugated paper insert portions.

14. The door of claim 13, wherein each of said insert portions has a thickness greater than the distance between said planar panel portion of said first facing and the corresponding planar panel portion of said second facing.

15. The door of claim 14, wherein said core has a thickness at least 0.010 inches greater than the distance between said planar panel portions.

16. The door of claim 1, wherein the said inwardly directed contoured portion has a draw depth of 0.25 inches or greater and a vector angle of 58 degrees or less.

17. The door of claim 1, wherein the said inwardly directed contoured portion has a draw depth of 0.3.75 inches or greater and a vector angle of 46 degrees or less.

18. The door of claim 1, wherein the said inwardly directed contoured portion has a draw depth of 0.5 inches or greater and a vector angle of 35 degrees or less.

19. The door of claim 1, wherein the said inwardly directed contoured portion has a draw depth of 0.625 inches or greater and a vector angle of 30 degrees or less.

20. The door of claim 1, wherein the said inwardly directed contoured portion has a draw depth of 0.75 inches or greater and a vector angle of 28 degrees or less.

* * * * *